May 16, 1933. B. L. QUARNSTROM 1,909,501
TUBE
Filed March 26, 1930
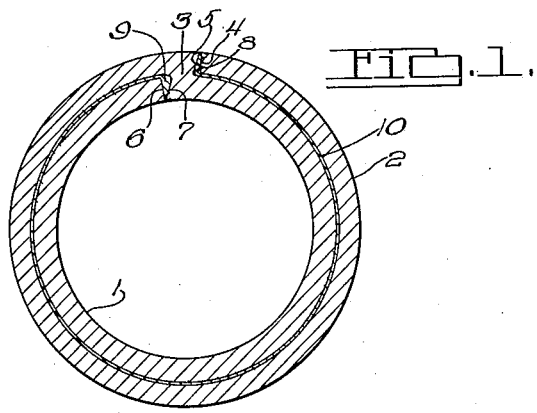
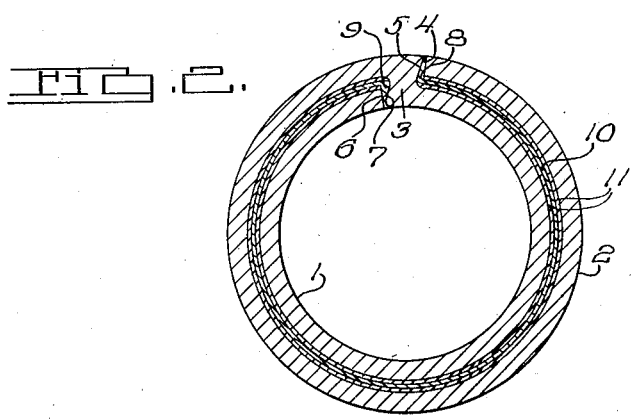
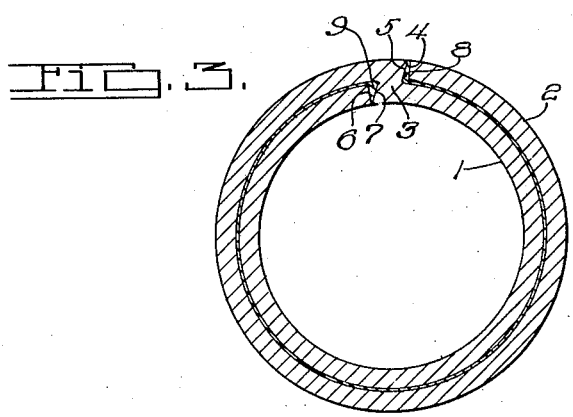
Bert L. Quarnstrom
INVENTOR
by Stuart C. Barnes
ATTORNEY Patented May 16, 1933

1,909,501

UNITED STATES PATENT OFFICE

BERT L. QUARNSTROM, OF GROSSE POINTE PARK, MICHIGAN, ASSIGNOR TO BUNDY TUBING COMPANY, OF DETROIT, MICHIGAN, A CORPORATION OF MICHIGAN

TUBE

Application filed March 26, 1930. Serial No. 438,935.

This invention relates to a tube and has to do especially with a tube having a seam. Such a tube may be made from strip stock rolled transversely into hollow cross sectional form.

The particular tube which forms the subject matter of this invention is a tube having a double wall, which is formed however from a single piece of stock rolled through substantially 720° so as to form an inner ply and an outer ply. The metal is provided with a jog or offset where the outer and inner plies join, and the two edges of the stock substantially butt up against opposite sides of this offset.

Tubes of this nature can be made from sheet steel stock and soldered together with the solder sealing between the plies and sealing the edges to the offset. The steel stock may be copper-coated or coated with an alloy of copper such as Monel metal or constantan before being soldered. On the other hand, the tube may be sealed by the copper or copper alloy itself in which the tube is subjected to sufficient heat to render the copper or copper alloy molten so that it welds together to hold the plies sealed, and also welds the edges to the offset.

The object of the invention is to provide a tube structure of the type described which has increased strength, and in this regard the invention is devoted especially to the formation of the tube at the seam in order that this part of the tube is strengthened.

In the accompanying drawing:

Fig. 1 is a sectional view taken through a double wall tube constructed in accordance with the invention showing a tube of sheet stock soldered together.

Fig. 2 is a similar view showing a copper or copper alloy plated strip of stock soldered together.

Fig. 3 is a similar view showing a tube welded together by the use of copper or copper alloy.

The tube, as shown in the drawing, comprises a strip of stock shaped into hollow cross sectional form having an inner ply 1 and an outer ply 2. The stock is provided with an offset or jog 3. One edge of the stock such as the edge of the outer ply, as at 4, substantially butts up against the exterior shoulder 5 of the jog, while the other edge of the stock, as at 6, substantially butts up against the inner shoulder 7.

It will be noted that the offset or jog 3 is given what may be termed a reverse bend. In other words, the jog 3 is bent so that it is on an angle which is less than 90° to a tangent perpendicular to a radial line passing through the center of the jog. The edges of the strip stock are, as a rule, substantially perpendicular to the surface of the stock, and accordingly, when the edges are drawn up close to the shoulders 5 and 6 there remains unfilled spaces 8 and 9 generally of triangular formation.

When a tube comprises a sheet of steel stock completed by solder is formed, the solder not only seals between the plies, as illustrated at 10, but it also fills the spaces 8 and 9 and securely holds the edges of the stock to the adjacent shoulders of the offset. The tube shown in Fig. 2 shows the steel stock with a copper plating 11 sealed by solder, and in this case the solder fills in the spaces 8 and 9. In Fig. 3 the strip stock forming the tube is welded together by molten copper and this molten copper fills the spaces 8 and 9 and securely holds the edges of the stock to the offset.

When a tube of this construction is subjected to high internal pressure the tendency is to expand the tube and this results in tending to straighten out the offset or jog. Should the internal pressure be sufficient to accomplish this (straightening out, or partially straightening out, of the offset) the wall of the tube is weakened because at the straightened out offset there is but a single ply. With the present tube, however, this offset is reversely bent in the formation of the strip stock; the edges of the stock are preferably drawn up very close to the shoulders formed by the jog so as to substantially butt against the shoulders both on the outside and on the inside of the tube. Thus the spaces 8 and 9 are substantially closed. When the tube is sealed by solder, copper, or copper alloy, the molten metal fills these spaces. Accordingly, any tendency to straighten out or atenuate the offset is effectively prevented. The outer shoulder of the offset butts up against the outer edge of the stock, through the means of the intervening sealing metal, while the inner shoulder of the jog tends to pull away from the inner edge of the stock which, however, is securely held thereto by the sealing metal. Accordingly, to straighten out the offset means to also displace and move both the inner and outer plies of the tube-forming stock. Thus the double walls of the tube aid in strengthening this longitudinal seam.

It will be appreciated that both the molten solder and molten copper and alloys thereof have high migratory characteristics when molten so that there is no difficulty whatever in filling the spaces 8 and 9 even though they are substantially closed. The drawing may be slightly exaggerated; the particular angle of the offset however may vary. In some of the claims appended hereto use is made of the term "sealing metal" and this is intended to mean solder, copper, copper alloy, such as Monel metal, or constantan, or brazing metals, or copper-silver solder, or the like.

I claim:

1. A tube made of sheet stock rolled into hollow cross sectional form having a longitudinal seam, said seam comprising an offset in the stock bent through an angle of slightly more than 90° with one edge of the stock substantially butting against a shoulder formed by the offset with said edge and shoulder sealed together by molten sealing metal.

2. A tube made of sheet stock rolled into hollow cross sectional form having a longitudinal seam, said seam comprising an offset in the stock bent through an angle of slightly more than 90° with one edge of the stock substantially butting against a shoulder formed by the offset with said edge and shoulder sealed together by molten sealing metal, the said edge having a direction of extension substantially perpendicular to the plane of a tangent meeting the edge so as to leave a triangularly shaped space between the edge and said shoulder which is filled with molten sealing metal.

3. A tube comprising a strip of metal fashioned in a hollow cross sectional form having inner and outer plies; an offset formed in the stock, said offset being disposed at an angle to its adjoining portions of the stock less than a right angle, the edge of the stock being in close proximity to shoulders formed by said offset, and said shoulders and edges being secured together by molten sealing metal.

4. In a double wall tube made of sheet stock rolled substantially through 720°, a seam construction comprising a reversely bent offset in the stock, the edges of the stock being in close proximity to the opposite sides of the offset and being sealed thereto by molten sealing metal.

5. In a double wall tube made of sheet stock rolled substantially through 720°, a seam construction comprising a reversely bent offset in the stock, the edges of the stock being in close proximity to the opposite sides of the offset, the said edges and reversely bent offset cooperating to form angularly shaped spaces, said spaces being filled by molten sealing metal to secure the offset and edges together.

In testimony whereof I affix my signature.

BERT L. QUARNSTROM.